(12) United States Patent
Linares

(10) Patent No.: US 9,861,998 B2
(45) Date of Patent: Jan. 9, 2018

(54) ASSEMBLY FOR COATING AN ARTICLE INCORPORATING ROBOTIC SUBASSEMBLIES UTILIZING ARTICULATING SPRAY ARMS AND CAROUSEL CONVEYOR WITH INLET AND OUTLET LOCATIONS FOR THE ARTICLE

(71) Applicant: Oria Collapsibles, LLC, Auburn Hills, MI (US)

(72) Inventor: Miguel A. Linares, Bloomfield Hills, MI (US)

(73) Assignee: Oria Collapsibles, LLC, Auburn Hills, MI (US)

( * ) Notice: Subject to any disclaimer, the term of this patent is extended or adjusted under 35 U.S.C. 154(b) by 126 days.

(21) Appl. No.: 14/679,764

(22) Filed: Apr. 6, 2015

(65) Prior Publication Data
US 2015/0283569 A1  Oct. 8, 2015

Related U.S. Application Data

(60) Provisional application No. 61/976,267, filed on Apr. 7, 2014.

(51) Int. Cl.
| | |
|---|---|
| *B05C 13/02* | (2006.01) |
| *B05B 13/02* | (2006.01) |
| *B05B 13/04* | (2006.01) |
| *B25J 9/00* | (2006.01) |
| *B05C 15/00* | (2006.01) |
| *B05C 13/00* | (2006.01) |

(52) U.S. Cl.
CPC ...... *B05B 13/0264* (2013.01); *B05B 13/0431* (2013.01); *B05B 13/0457* (2013.01); *B25J 9/0093* (2013.01); *B05C 13/00* (2013.01); *B05C 15/00* (2013.01); *Y10S 901/31* (2013.01); *Y10S 901/43* (2013.01)

(58) Field of Classification Search
CPC ............ B05B 13/0264; B05B 13/0431; B05B 13/0457; B05B 13/02; B05B 13/04; Y10S 901/31; Y10S 901/43; B05D 1/02; B25J 9/042; B25J 9/044; B25J 9/0087; B25J 11/0075
USPC ...... 118/323; 427/427.2; 901/31, 43, 15, 27; 414/539; 198/475.1, 346.3, 456, 605, 607
See application file for complete search history.

(56) References Cited

U.S. PATENT DOCUMENTS

| | | |
|---|---|---|
| 3,942,926 A | 3/1976 | Bulloch, Jr. |
| 3,981,956 A | 9/1976 | Redmer et al. |

(Continued)

FOREIGN PATENT DOCUMENTS

| | | |
|---|---|---|
| JP | 62-279861 | 12/1987 |
| JP | 2003-053506 | 2/2003 |

*Primary Examiner* — Karl Kurple
(74) *Attorney, Agent, or Firm* — Dinsmore & Shohl LLP

(57) ABSTRACT

A process and assembly for mass producing a plasticized coated and structurally supporting insert including a first conveyor for advancing a plurality of lay-flat inserts and at least one lift and transfer mechanism for transferring the inserts between the first conveyor and a second overhead conveyor. A dual function robot is positioned aside the first conveyor and has a first numerically controlled gripping portion for engaging and raising a selected one of the lay flat supported inserts. The robot further has a second numerically controlled and articulating arm for spray coating a plasticized material upon the insert.

7 Claims, 4 Drawing Sheets

(56) References Cited

U.S. PATENT DOCUMENTS

| | | | |
|---|---|---|---|
| 4,589,467 A | | 5/1986 | Hunter |
| 4,669,168 A | * | 6/1987 | Tamura .................. B25J 9/0093 29/429 |
| 6,365,221 B1 | * | 4/2002 | Morton .................. B05B 13/005 427/140 |
| 6,797,066 B2 | | 9/2004 | Yoshino et al. |
| 8,167,605 B2 | | 5/2012 | Linares |
| 8,176,869 B2 | | 5/2012 | Linares |
| 8,356,574 B2 | * | 1/2013 | Wurster .............. B05B 13/0221 118/500 |
| 8,420,179 B2 | | 4/2013 | Linares |
| 2002/0134311 A1 | * | 9/2002 | Yoshino .................. B05B 5/082 118/719 |
| 2005/0133610 A1 | | 6/2005 | Cowelchuk et al. |
| 2011/0166708 A1 | * | 7/2011 | Herre .................. B05B 13/0431 700/258 |
| 2012/0037073 A1 | * | 2/2012 | Linares .............. B05B 13/0264 118/696 |
| 2013/0034660 A1 | | 2/2013 | Koyanagi et al. |

\* cited by examiner

ASSEMBLY FOR COATING AN ARTICLE INCORPORATING ROBOTIC SUBASSEMBLIES UTILIZING ARTICULATING SPRAY ARMS AND CAROUSEL CONVEYOR WITH INLET AND OUTLET LOCATIONS FOR THE ARTICLE

CROSS REFERENCE TO RELATED APPLICATIONS

This Application claims the benefit of U.S. Provisional Application 61/976,267 filed on Apr. 7, 2014, the contents of which are incorporated herein in its entirety.

FIELD OF THE INVENTION

The present invention is directed to production assemblies for creating a reinforced pallet exhibiting a resin exterior encasing an inner rigid core. More specifically, the present invention discloses a production assembly and associated process for mass producing such a thermoplastic pallet which is an improvement of the spray applicating process and assembly set forth in each of U.S. Pat. No. 8,420,179 and U.S. Pat. No. 8,176,896, and which utilizes a multiple insert supporting and continuously moving carousel inter-faceable with an input line upon which is transported a plurality of rigid and planar shaped inserts, as well as an output line a spaced relationship from the input line for removing, from the carousel, the resin coated articles. The invention further teaches a series of subset variants utilizing uniquely configured robot spray arms for spray applying a two part resin and hardener, such as successively upon horizontal and vertical arrayed positions of the insert according to a selected thickness and in order to create a finished pallet.

Additional features include modifications to the lift and transfer mechanisms communicable between the input and output lines and which can integrate modifications to robotic stations incorporating the ability to both spray coat the inserts as well as to rotate and reset the same upon a horizontal conveyor. Additional articulating robots can be employed for spraying the plastic coating upon vertically and horizontally oriented inserts, such as which are traversed along an overhead conveyor between respective conveyors.

A further variant of the present inventions contemplate reconfiguring the inlet and outlet conveyors as a single substantially circular or otherwise arcuate overhead conveyor having proximally located inlet and outlet locations. Both an overhead line and underneath located lay-flat carousel conveyor are provided and, in combination with a series of successively located robots, operate in a timed series of operations for coating the insert. One non-limiting version of a coating protocol made possible by the unique robotic assemblies can include the series of robots successively extracting an insert from an inlet location of the overhead line, placing the insert upon the carousel, spraying the insert, replace upon the carousel and, finally, picking up the coated and at least partially drying insert for placement back upon the outlet end of the overhead conveyor.

BACKGROUND OF THE RELEVANT ART

The prior art is documented with examples of spray applicating processes and assemblies for applying a plasticized coating to a pallet blank. A first example of this is the process and manufacturing assembly of U.S. Pat. No. 8,420,179 which discloses mass producing such as a thermoplastic pallet and which utilizes a multiple insert supporting and continuously moving carousels inter-faceable with an input line upon which is transported a plurality of rigid and planar shaped inserts, as well as an output line a spaced relationship from the input line for removing, from the carousel, the resin coated articles. The invention further teaches a series of subset variants for spray applying a two part resin and hardener upon the insert according to a selected thickness, following which the inserts are cured and dried prior to transferring to the output line and in order to create a finished product.

U.S. Pat. No. 8,176,869 teaches a related assembly and process in which teaches a series of subset variants for spray applying a two part resin and hardener upon the insert according to a selected thickness, following which the inserts are cured and dried prior to transferring to the output line and in order to create a finished product. Another related disclosure is set forth in the article, assembly and process for producing a structurally supporting insert as depicted in US 2009/0246461.

U.S. Pat. No. 8,167,605 teaches a further related production assembly and process in which a first lift and transfer mechanism communicates between the input line and mold assembly line for collecting, in succession, an insert and an upper mold half for installation with a lower mold half supported upon the assembly line. A mixing and dispensing station communicates with each mold in succession to fill an interior thereof with a viscous and curable resin material. A second lift and transfer mechanism is communicable between the mold assembly line and output line for removing the finished articles from the mold and depositing upon the output line, concurrent with redirecting the empty mold halves along return lines for redelivery to said mold assembly line.

SUMMARY OF THE PRESENT INVENTION

The present invention discloses an improved process and assembly for mass producing a plasticized coated and structurally supporting insert (e.g. environmentally resistant and load supporting pallet article) which incorporates a unique and multi-functional robotic spray assembly and which interfaces with both the inlet and outlet conveyor lines (or rotary carousal line) as well as the communicating overhead conveyor line(s). In a first variant, a pair of spray robots includes a first robot subassembly with an articulating and numerically controlled spray arm at a first location underneath an overhead conveyor supporting a succession of vertically oriented pallet inserts or blanks, following transfer and placement of the blanks from an inlet conveyor line by a robotic lift and transfer assembly.

A selected one of the spray robots includes a spray arm which is articulated to spray a plastic material across the vertically oriented upper and lower (top and bottom) surfaces of the pallet insert. A further selected and dual function spray robot is located proximate an outlet lay flat conveyor for intercepting a partially coated insert following a second outlet located lift and transfer mechanism removing the insert from the overhead conveyor and placing on the outlet conveyor.

The dual function robot includes a first vertically displaceable grip and manipulate-able portion for engaging and elevating the partially coated insert using a sufficient small footprint so as not to blemish or otherwise obscure the as yet to be coated surfaces of the insert. The gripping or engaging portion can include a stem which seats within a side edge aperture or the like formed in the insert. In another non-limiting variant, the grip and manipulate-able portion can also include one or more suction inducing surfaces for creating a vacuum seal with a central most upper (previously coated and sufficiently cured) surface of the insert.

In this fashion an upper extending and multi-axial articulating spray arm (configured upon both versions of the spray robot) is numerically controlled in order to successively coat with the plasticized material each of the four interconnecting edge surfaces, these being successively oriented in a horizontal fashion through iterative rotation of the pallet at the suction induced end of the grip and manipulate-able portion, this about a horizontal axis a displaced distance above the outlet conveyor. Following the second coating operation, the now completely coated pallet is replaced upon a plurality of upwardly projecting pegs associated with the outlet conveyor with the side edges permitted to cure and dry as the coated pallets are removed.

In a second variant, a circular shaped and closed perimeter extending conveyor is positioned inside of a likewise arcuate/rotary shaped and overhead extending carousel having both inlet and outlet locations. Any number of lift and transfer stations (a total of six being illustrated) are provided at spaced locations about the perimeter of the closed circular conveyor. The lift and transfer stations each operate in a first actuating protocol to remove an uncoated insert from the carousel for placement upon a location of the circular conveyor.

A plurality of dual function lift and spray robots are again provided in alternating fashion with the lift and transfer stations and, upon rotating the conveyor, advance the supported inserts to a location in which the lift and spray robots can access the inserts for applying the desired plasticized spray coating. This can further include the vertically displaceable gripping portion again including a stem like shape which seats within a side edge aperture of the pallet insert for raising the insert off of the conveyor, manipulating the same to progressively coat, and then replacing back onto the conveyor surface.

Following synchronized coating and replacement of the pallet inserts, the conveyor is further incrementally rotated in order advance the coated and structurally supporting inserts to positions in which they are engaged by succeeding lift and transfer stations for replacement on the overhead carousel and prior to them exiting in sequential fashion through the carousel outlet.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

As previously described, the present invention provides a series of improvements to the spray applicating process and production assembly for manufacturing. As will be described in more detail below, the process and assembly includes the provision of modified lift and transfer mechanisms communicable between input and output lines and which can integrate modifications to robotic stations incorporating the ability to both spray coat the inserts as well as to rotate and reset the same upon a horizontal conveyor.

Additional articulating robots can be employed for spraying the plastic coating upon vertically oriented inserts, such as which are traversed along an overhead conveyor between respective conveyors. A still further variant of the present inventions contemplate reconfiguring the inlet and outlet conveyors as a single substantially circular or otherwise arcuate overhead conveyor having proximally located inlet and outlet locations.

Both an overhead line and underneath located lay-flat carousel conveyor are provided and, in combination with a series of successively located robot stations or subassemblies, operate in a timed series of operations for coating the insert. As will be described in further detail, a number of non-limiting variants of the present inventions contemplate an insert coating protocol or operation in which any number of transfer stations or mechanisms operated in conjunction with one or more numerically controlled spray robots, and in order to transfer the inserts between one or more conveyors (such as including a pair of linear inlet and outlet conveyors in a first operation or a single closed circular conveyor in a second operation) and an elevated carousal during the coating operation.

Figure 1:
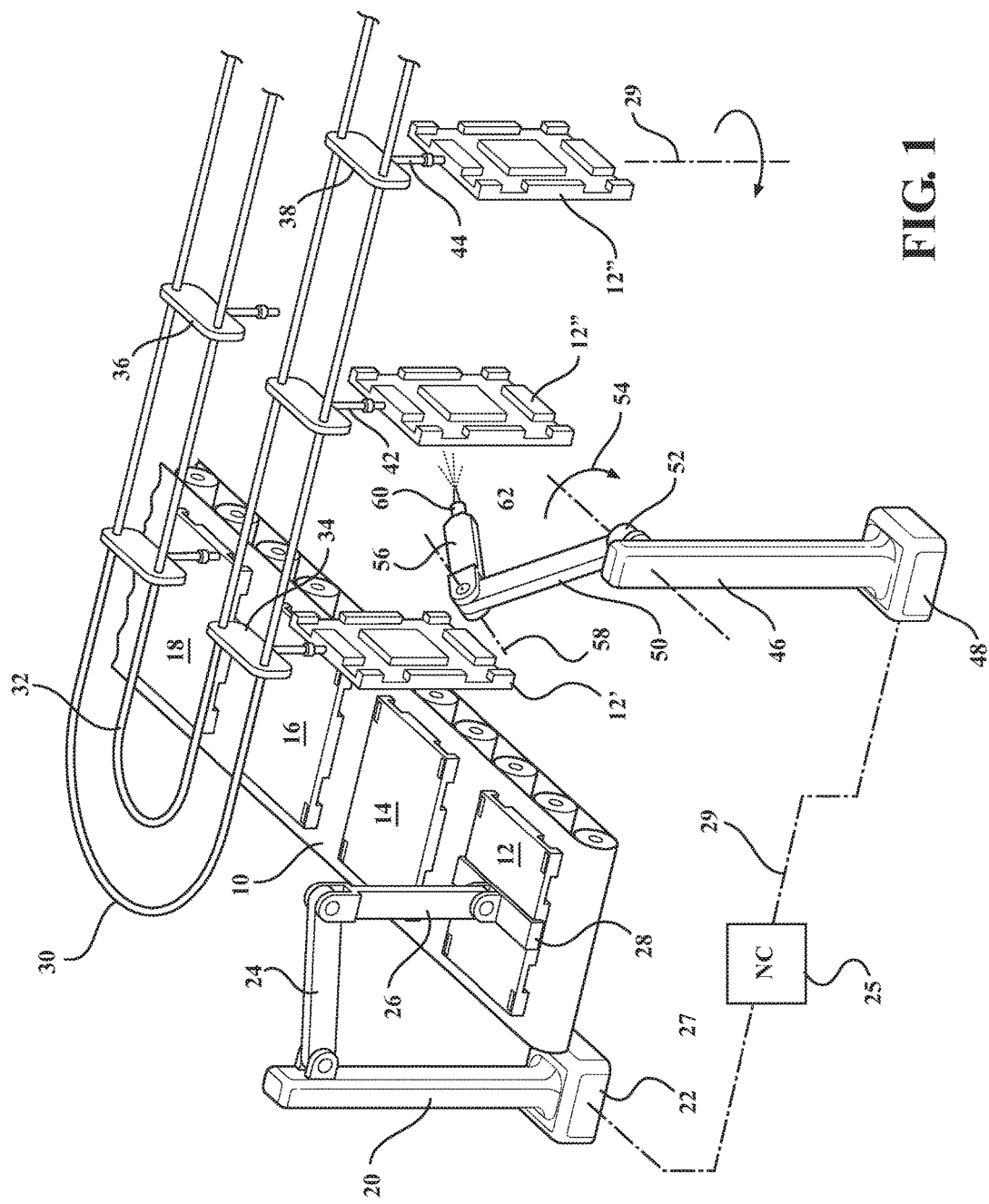
FIG. 1 is a sectional perspective of an input side of a spray assembly line and in which a first automated acquisition and transfer assembly is located in communication with both a selected conveyor line and a location of an insert input line, a pair of robots including a first lift and transfer robot for placing the lay flat insert upon the overhead conveyor, a second articulating robot providing spray coating of the overhead suspended and vertically arrayed insert.

The above stated and referring to FIG. 1, a sectional perspective is depicted of a first variant of the present inventions and which includes an input or inlet conveyor line 10 upon which are situated a plurality of individual blanks or inserts 12, 14, 16, 18 for producing a resin coated article, such as a thermoplastic formed and reinforced pallet construction.

As will be discussed in further detail, the present invention enables mass production of resin coated articles, such as pallets or the like, and which is not available with current production methods and techniques. The present invention contemplates incorporating any number of individual conveyor lines in the present assembly, this including the adding of new conveyor lines as well as selective activation and deactivation of one or more existing lines in order to scale up or down the desired volume of completed resin coated products (e.g. resin coated pallets).

Although not further shown, it is understood that appropriate control and processer capabilities are incorporated into the overall assembly, and which synchronize the transport speed and operation of any combination of lay flat and overhead conveyors, as well as associated lift and transport robots (termed herein as transfer stations or transfer mechanism) and corresponding spray/insert rotating robots located in communication with both the lay flat conveyor lines and overhead/elevated carousal lines. The spray robots further include at least one dual purpose robot which initially provides gripping, elevating and manipulating of the inserts in a first operation (such as to and from the lay flat conveyor), concurrent with the spray applying of the plasticized coating to the surfaces of the insert.

As is further shown, the inserts 12-18 are generally planar shaped, with a given thickness and, as further shown, can exhibit a desired honeycombed or otherwise apertured design between upper and lower faces thereof (not shown). In one non-limiting application, the inserts can be constructed of a rigid paperboard or particle board material and which, when coated with the desired composite resin, provides an extremely durable, weight and weather resistant article including most notably a resin coated pallet.

The plastic coating can include either a known recipe or a proprietary (trade secret) composition and can also incorporate additional components such as particulates or the like for providing desired material properties depending upon the environmental conditions uncovered. For purposes of the present description, the composition and techniques surrounding the application of a plastic spray material, such as to a wooden or paperboard/corrugated material, contemplate such as any type of polystyrene, polyurethane or other material which can be spray applied or flowed over the exposed surfaces of the substratum material in such a way as to maintain its structural integrity while also delivering long term environmental protection.

Without limitation, the term plasticized coating can apply to any type of water-based polymer providing barrier and functional coatings for flexible film packaging, paperboard, and corrugated cartons. Such may further incorporate water-based surface modifiers, additives and polymers for numerous industries including wood care, industrial coatings, inks, fibers, composites, and construction products.

Referring again to FIG. 1, a lift and transfer assembly is shown and includes a vertical superstructure 20 extending upwardly from a pedestal supported base 22 and is located in communication with the selected inlet or feed line 10 upon which the inserts are provided in lay-flat fashion. First and second pivotally interconnected arm portions 24 and 26 are associated with selected lift and transfer assembly 20, the second arm portion terminating in a widthwise extending gripping portion 28, which is both configured and numerically operated for grasping and transferring the inserts 12-18 in succession for placement upon an overhead conveyor. Although not shown, this can include the gripping portion 28 exhibiting any type of clasp, tang or detent for grasping the edges of the insert during transfer, such further being provided with both engage and release positions to ensure smooth transfer of the inserts. A numerical controller, generally represented at 25 and according to any known construction, communicates with the lift and transfer mechanism (see communication line 27 which can also represent any manner of instructing the transfer mechanism).

The overhead or elevated conveyor, according to the non-limiting variant depicted, includes a pair of outer 30 and inner 32 spaced apart support members, these typically being suspended from a ceiling of the facility by such as hangers (not shown), and between and from which extend a plurality of spaced apart spacers or structural supports 34, 36, 38, et seq. Also depicted are downwardly extending support arms 40, 42, 44, et. seq. which are understood to represent any suitable structure for receiving and supporting the various inserts delivered by the The inserts are configured such that, upon the lift and transfer mechanism or assembly (see again components 20-28) lifting a selected insert 12, the insert is transferred to a further position depicted by succeeding insert 12' such that it is supported in downwardly suspended fashion upon a selected support arm 40. While not shown, a rotatable spindle can be supported at a lower end of each support arm 40, 42, 44, et seq. for rotating the vertically suspended inserts about a horizontal axis (see at 29 in FIG. 1). It is further envisioned and understood that the individual carriers and spindles can be constructed to rotate at a given speed or rate and concurrent with the carriers being continuously advanced by supporting/suspending carousel. Other variants also contemplate fixed (non-rotative) support of the inserts during either or both of the spray applicating and curing processes.

As further shown in FIG. 1, the numerically operated arms 24 and 26 of the first lift and transfer mechanism are articulated so that the end positioned gripping portion 28 (exhibited as a width extending plate or bracket with end secure angled or gripping portions) fastens to and elevates the selected insert 12-18 in a widthwise supported fashion and in order to acquire the insert from the input or feed line 10. As shown in FIG. 1, it is understood and envisioned that the arrangement of the multiple carousels with associated lift and transfer mechanisms is provided so that each line acquires a steady progression of inserts in a continuous and concurrent fashion, such that the potential output of the assembly can approach upwards of one completed resin coated article per second, more or less.

A spray robot is positioned at a location along the overhead conveyor and includes a superstructure 46 extending upwardly from a base or pedestal 48. A first articulating arm 50 is rotatably supported at a base coupled location to 52 to an upper end of the superstructure 46 such that it can rotated about a horizontal axis 52 (see also directional axis and arrow 54). A second inter-articulating arm 56 is pivotally coupled to an end of the first arm 50 (see further directional axis and arrow 56) so that a remote nozzle end 60 can issue a plasticized spray 62 as previously described, and such as which can coat an insert at a further downstream location 12", until being fully coated with the plasticized material as further depicted at location 12'''.

One advantage of the spray robot is that it permits coating of a series of vertically oriented surfaces of the insert and with the option of whether to move or otherwise rotate the insert. A further communication line is depicted at 29 representing instructions sent from the numerical controller 25 to the spray robot.

Figure 2:
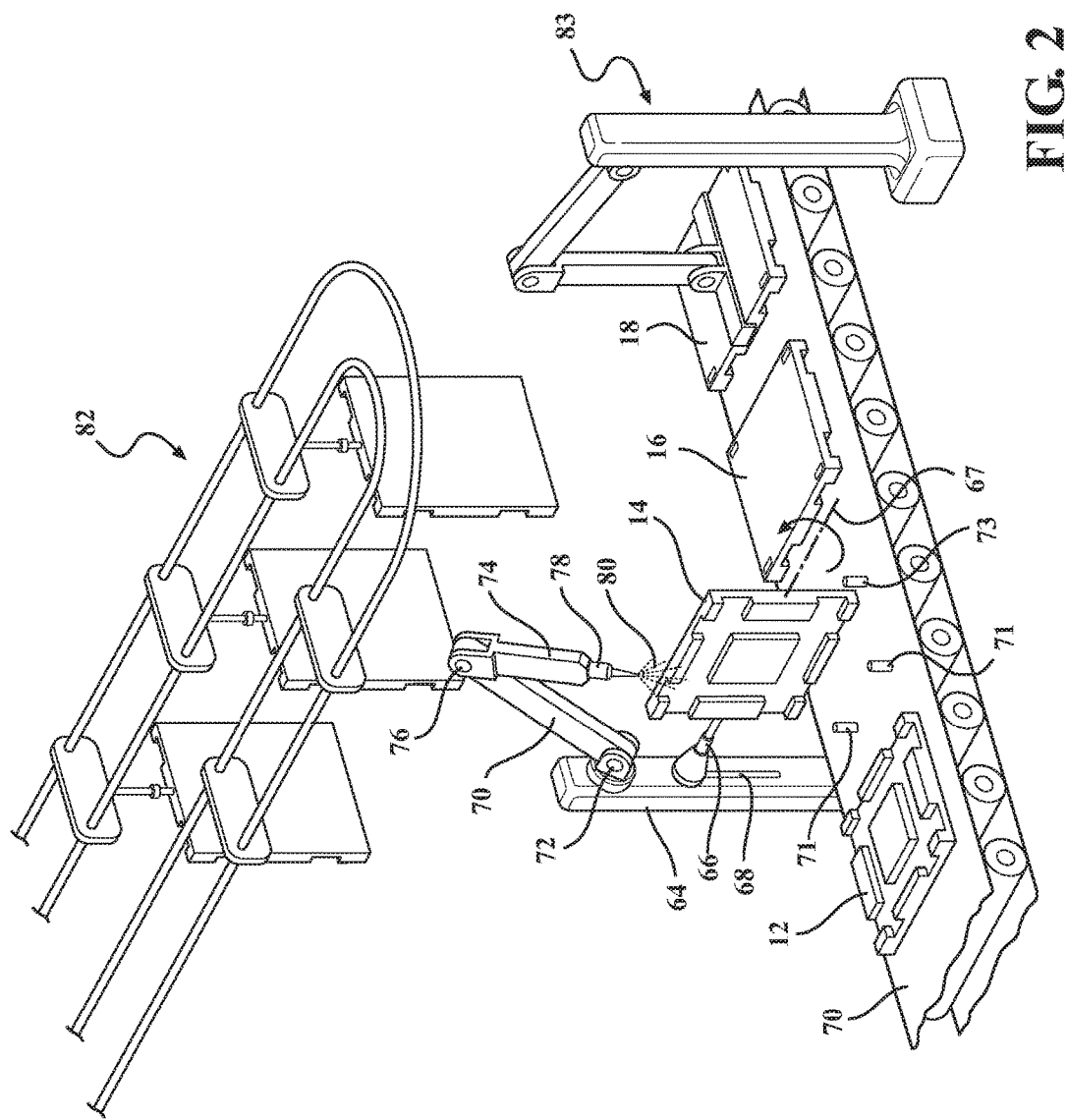
FIG. 2 is a perspective of a succeeding illustration to FIG. 1 in which a dual function robot is provided in cooperation with a single feed inlet or outlet conveyor for picking up and progressively/alternatingly spraying an insert according to a second coating operation, and prior to resetting the coated insert upon the lay-flat conveying line for subsequently being transferred by a further lift and transfer robot to or from a location of an overhead conveyor.

Proceeding to FIG. 2, a perspective view is shown of a succeeding configuration which can operate either as a succeeding operation to that shown and described in FIG. 1, or which can separately function in an alternate variant. Specifically, a dual function robot is provided (distinguishable from that depicted in FIG. 1) and which includes a superstructure base 64 with vertically lifting gripping portion, referenced herein as a stem 66, which is traversable along a channel or guide track 68 formed in the superstructure 64 and between a lower portion for engaging the lay flat insert 12 and an upper portion for elevating and rotating or otherwise manipulating the insert.

The dual function robot is communicated to a numerical controller (such as depicted in FIG. 1) and receives a series of programmed instructions for enabling it to lift a selected insert 12' off from a variation of a floor or lay flat conveyor 70, such further including sets of vertically positioned support posts (see total of four including first pair 72 and second pair 74) upon which is placed the inserts. Although not shown, additional items such as vision sensors and the like can be integrated into the controller structure as known in the relevant art and in order to provide for precise locating of the inserts during the various operations.

The dual function robot further includes an upper articulating spray assembly which includes first articulating arm 70 rotatably supported at a base coupled location to 72 to an upper end of the superstructure 64 such that it can rotated about a horizontal axis. A second inter-articulating arm 74 is pivotally coupled to an end of the first arm 70, at 76, so that a remote nozzle end 78 can issue a plasticized spray 80 as previously described, and such as which can coat each succeeding insert 12-18.

As previously described, the dual function robot of FIG. 2 can operate in a first variant succeeding the initial spray operation of FIG. 1, in which the overhead carousal is an extension of that shown in FIG. 1 and the conveyor 70 represents a second linear extending outlet conveyor for supporting thereupon the inserts in a lay flat position, this in order to successively spray coat horizontally arrayed surfaces of the insert (see selected at 14), prior to gripper 66 rotating the insert back to a horizontal orientation (see horizontal axis 67) for resetting each insert in succession back upon the pairs of support posts 71/73 projecting from the lay flat conveyor surface 70.

As further explained, the variant of FIG. 2 is also envisioned to operate as a stand-alone or alternate variant in which the conveyor line 70 operates as a stand-alone and, following the spray portion of the dual function robot being programmed to coat all of the exterior surfaces of the inserts in succession, a succeeding lift and transfer mechanism, generally at 83 and which is identical to that described in FIG. 1, transfers the inserts to a separate overhead conveyor generally represented at 82.

Figure 2A:
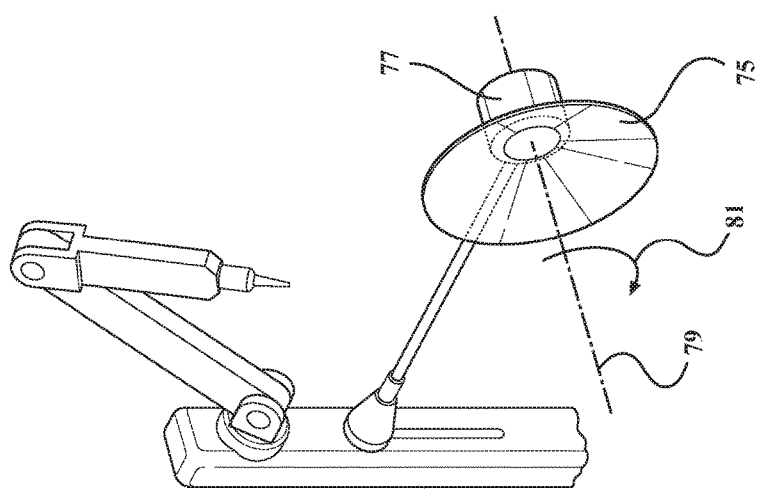
FIG. 2A is a sectional view of an alternate variant of an engaging/gripping, lift/lower and manipulate-able portion associated with the dual function spray robot of FIG. 2 and including an alternative suction engaging element for gripping such as a pre-coated upper surface of the pallet insert.

FIG. 2A presents a sectional view of an alternate variant of an engaging/gripping, lift/lower and manipulate-able portion associated with the dual function spray robot of FIG. 2. In FIG. 2, the projecting stem 66 associated with the lower insert gripping portion can be configured in one application so as to be linearly extended to seat within an edge configured aperture (see as better shown in FIG. 4) formed in the insert and which can operate in one desired variant in which all exterior surfaces of the insert are coated in a single operation utilizing the dual function robot.

In FIG. 2A, the selected insert is removed and an alternative suction engaging element 75 is revealed, this supported upon an end configured hub 77. The suction or vacuum engaging version of the invention is provided for gripping such as a pre-coated upper surface of the pallet insert as shown in FIG. 1. In this fashion, the hub 77 can include a rotating component to which the suction element 75 is secured and so that the insert can be rotated about axis 79 as further reflected by directional arrow 81, this to further assist the coating of a series of progressively horizontally arrayed edges.

Figure 3:
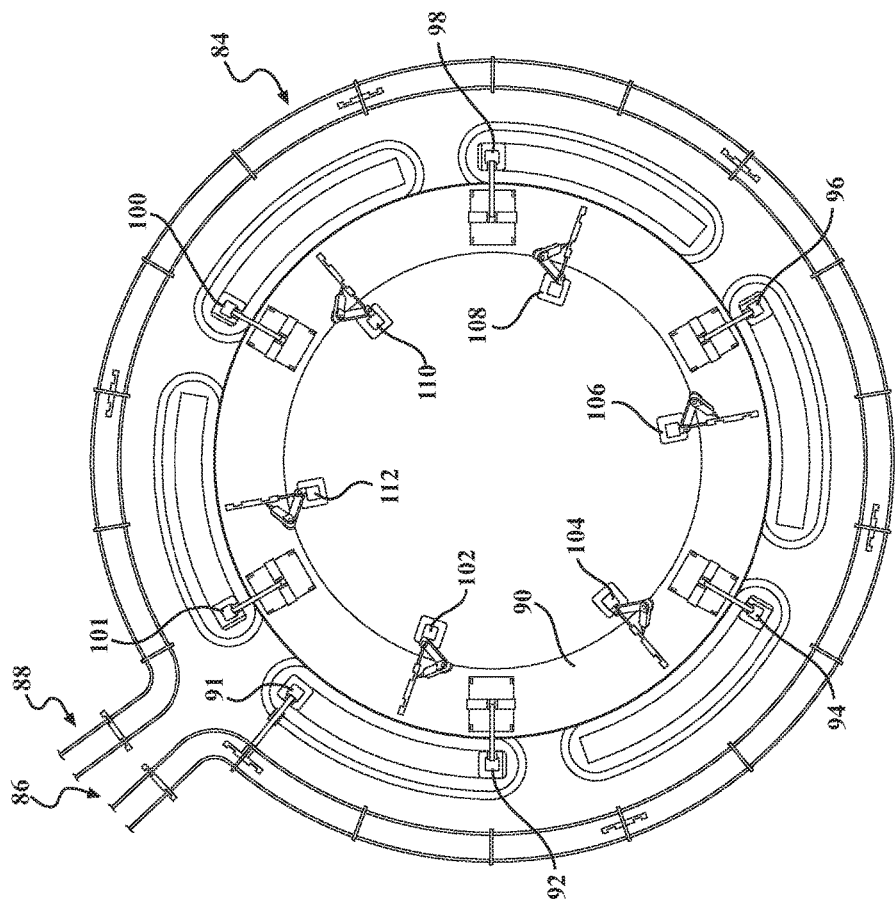
FIG. 3 is an overhead position of a further non-limiting variant of assembly and which includes a generally circular overhead conveyor with proximally located inlet and outlet lines, in combination with a lay flat and fully circular carousel line, pluralities of lift and transfer robots and spray/rotate robots being provided in peripherally spaced fashion in proximity to the conveyor and carousel lines.

Proceeding to FIG. 3, an overhead position is generally represented of a further non-limiting variant of assembly and which includes a generally arcuate (pseudo circular) shaped overhead or elevated conveyor 84, with proximally located inlet 86 and outlet 88 locations. In combination, an interiorly concentric (or closed circular) and proximally arrayed lay flat conveyor line is also depicted at 90.

A plurality of lift and transfer robots 91, 92, 94, 96, 98, 100 and 101 are arrayed about an exterior of the closed carousel lay flat conveyor 90 and, in combination with a further plurality of dual function robots 102, 104, 106, 108, 110 and 112 arrayed about an interior of the closed carousel conveyor 90, are provided in peripherally spaced fashion in proximity to the conveyor 84 and carousel 90 lines.

Figure 4:
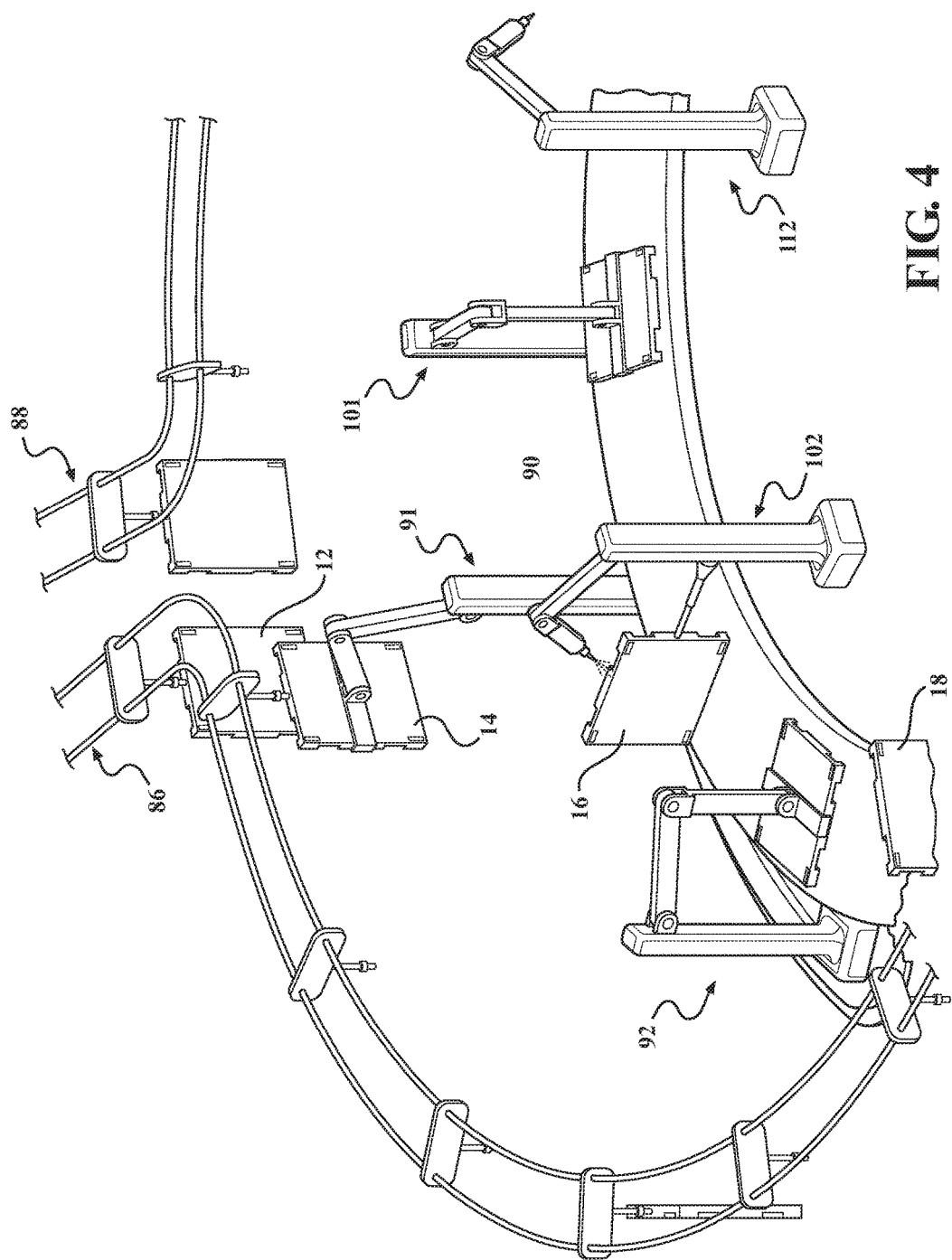
FIG. 4 is a sectional perspective of the assembly in FIG. 3 and showing a selected series of steps including a first sub-plurality of lift and transfer robots removing inserts from the overhead conveyor, with a second sub-plurality of robots elevating the horizontally disposed inserts from the carousel conveyor and progressively rotating/spray coating the same, prior to setting back down on the carousel for re-delivery by one or more downstream located lift and transfer robots back onto the overhead conveyor proximate the outlet location.

The lift and transfer and spray robots are similar to as previously described in FIG. 2, such that a repetitive description is unnecessary and, as further depicted in the sectional perspective of FIG. 4, are arranged in subset groupings, a selected one of which performs a series of operations. These include loading of an insert (transferring from overhead conveyor 84 to a lay flat location of circular conveyor 90) as referenced by selected lift and transfer mechanism 91, gripping, elevating and combined manipulating and spraying station (see robot 102) of the insert prior to returning the coated insert to the conveyor 90, and following which the further lift and transfer mechanism 92 returns the coated insert to the overhead conveyor for communication to its outlet 88.

In this fashion, simultaneous coating operations occurring between similar arrangements of lift and transfer mechanisms and dual function grip/lift/manipulate and spray robots in perimeter spaced fashion about the circular and concentric arranged conveyors, with the unload/replacement station located lift and transfer mechanisms 94, 96, 98 and 100 operating in combination at least with corresponding dual purpose lift/spray robots 104, 106, 108 and 110 in order to coat a number of inserts in simultaneous and continuous fashion.

Other and additional curing and drying operations can be performed in combination with the transfer and spray coating of the inserts. Without limitation, each of the robots described herein can again include suitable numerical control processor technology and can be paired or otherwise communicated with other components of the system and assembly in order to coat and output inserts at a desired manufacturing rate.

Additional methods for coating a structurally supporting article, such as a pallet, are also disclosed and, in a first variant, include the steps of conveying a plurality of planar shaped inserts along an inlet line, elevating the inserts, spraying a first series of vertical oriented surfaces of the inserts with a plasticized coating and depositing the coated inserts upon an outlet line. Additional steps include successively gripping, elevating and manipulating the inserts from the output line concurrent with spraying a second series of horizontal oriented surfaces of the inserts with the plasticized coating and replacing the coated inserts upon the output line. The above method can further include the steps of transferring the inserts from the inlet line to a first location of an elevated carousel conveyor prior to spraying the first series of vertical oriented surfaces and subsequently transferring the inserts from the elevated carousel to said outlet line prior to spraying the second series of horizontal oriented surfaces.

A further variant of the present method includes the steps of conveying a plurality of planar shaped inserts along an arcuate shaped and elevated carousal having an inlet and an outlet, transferring the inserts from the elevated carousal to a circular shaped and closed conveyor, and advancing the inserts upon the conveyor a first rotary distance. Additional steps include successively gripping, elevating and manipulating the inserts from the conveyor concurrent with spraying applying a plasticized coating, replacing the coated inserts upon the conveyor, advancing the inserts upon the conveyor a second rotary distance and transferring the inserts from the conveyor back to the elevated carousal.

Having described my invention, other and additional preferred embodiments will become apparent to those skilled in the art to which it pertains, and without deviating from the scope of the appended claims.

I claim:

1. An assembly for coating a structurally supporting article, comprising:
    a first conveyor for advancing inserts arrayed in an initially lay-flat position;
    at least one lift and transfer mechanism for transferring said inserts between said first conveyor and a second conveyor; wherein said second conveyor is elevated;
    said first conveyor extending in a circular and closed shape, said second conveyor surrounding said first conveyor in an arcuate shape and said second conveyor having both inlet and outlet locations for said inserts; and
    a dual function robot positioned aside said first conveyor and having a first numerically controlled gripping portion for engaging and raising one of said inserts from said first conveyor, said dual function robot further having a second numerically controlled and articulating arm for spray coating a plasticized material upon said inserts.

2. The assembly as described in claim 1, said dual function robot further comprising a superstructure within which is configured a vertical slot for supporting said first numerically controlled gripping portion so as to be traversable along a vertical length of said dual function robot beneath said second numerically controlled and articulating arm for spray coating.

3. The assembly as described in claim 2, said second conveyor further comprising a plurality of extending arms upon which are suspended said inserts.

4. The assembly as described in claim 1, said first numerically controlled gripping portion further comprising a superstructure within which is formed a guide track, a stem engaging said inserts within a side edge aperture formed in said inserts, said stem being displaceably and rotatably supported within said guide track.

5. The assembly as described in claim 1, further said first conveyor further comprising pluralities of upwardly projecting support posts upon which are supported said inserts.

6. The assembly as described in claim 1, said at least one lift and transfer mechanism further comprising a plurality of lift and transfer robots, said plurality of lift and transfer robots circumferentially spaced and arranged with said dual function robot; said dual function robot positioned along said first conveyor and between a pair of lift and transfer robots.

7. The assembly as described in claim 1, further comprising said second conveyor being elevated above said first conveyor.

* * * * *